US010247308B2

(12) United States Patent
Ikebukuro et al.

(10) Patent No.: US 10,247,308 B2
(45) Date of Patent: Apr. 2, 2019

(54) HERMETIC SEAL DEVICE

(71) Applicants: Koyo Sealing Techno Co., Ltd., Tokushima (JP); Nabtesco Corporation, Tokyo (JP)

(72) Inventors: Kazuha Ikebukuro, Tokushima (JP); Koji Kubota, Mie (JP); Shuji Kurita, Mie (JP)

(73) Assignees: Koyo Sealing Techno Co., Ltd., Tokushima (JP); Nabtesco Corporation, Tokyo (JP)

( * ) Notice: Subject to any disclaimer, the term of this patent is extended or adjusted under 35 U.S.C. 154(b) by 481 days.

(21) Appl. No.: 14/898,549

(22) PCT Filed: Apr. 18, 2014

(86) PCT No.: PCT/JP2014/061047
§ 371 (c)(1),
(2) Date: Dec. 15, 2015

(87) PCT Pub. No.: WO2014/203609
PCT Pub. Date: Dec. 24, 2014

(65) Prior Publication Data
US 2016/0153564 A1  Jun. 2, 2016

(30) Foreign Application Priority Data
Jun. 21, 2013 (JP) ................................ 2013-130792

(51) Int. Cl.
*F16J 15/16* (2006.01)
*F16J 15/3284* (2016.01)
(Continued)

(52) U.S. Cl.
CPC ......... *F16J 15/3284* (2013.01); *F16J 15/324* (2013.01); *F16J 15/3232* (2013.01)

(58) Field of Classification Search
CPC ....... F16J 15/32; F16J 15/3204; F16J 15/3244
See application file for complete search history.

(56) References Cited

U.S. PATENT DOCUMENTS

| | | | |
|---|---|---|---|
| 4,084,826 A * | 4/1978 | Vossieck | F16J 15/3244 277/559 |
| 4,183,543 A * | 1/1980 | Antonini | F16J 15/3244 277/559 |

(Continued)

FOREIGN PATENT DOCUMENTS

| | | |
|---|---|---|
| EP | 1701071 A1 | 9/2006 |
| GB | 2296070 A | 6/1996 |

(Continued)

OTHER PUBLICATIONS

Extended European Search Report issued in corresponding European Patent Application No. 14814543.6 dated Feb. 6, 2017 (8 pages).

(Continued)

*Primary Examiner* — Gilbert Y Lee
(74) *Attorney, Agent, or Firm* — Osha Liang LLP (57) ABSTRACT

A sealing device includes an annular seal portion formed of an elastic material. On an inner peripheral surface of the seal portion, a main lip is formed so as to be in slidable contact with an outer peripheral surface of a rotary shaft, and a vacuum space side inclined surface is formed so as to gradually enlarge in diameter from the main lip toward a vacuum space side. On the vacuum space side inclined surface, a plurality of annular projections are formed along an axial direction so as to be in slidable contact with the outer peripheral surface of the rotary shaft in a state where the main lip is in slidable contact with the outer peripheral surface of the rotary shaft.

4 Claims, 4 Drawing Sheets

(51) Int. Cl.
*F16J 15/324* (2016.01)
*F16J 15/3232* (2016.01)

(56) References Cited

U.S. PATENT DOCUMENTS

| | | | | |
|---|---|---|---|---|
| 4,399,998 A | * | 8/1983 | Otto | F16C 33/7823 |
| | | | | 277/552 |
| 4,560,177 A | | 12/1985 | Riley, Jr. | |
| 4,815,749 A | * | 3/1989 | Johnston | F16J 15/3244 |
| | | | | 277/559 |
| 5,326,112 A | * | 7/1994 | Paykin | F16J 15/166 |
| | | | | 277/565 |

FOREIGN PATENT DOCUMENTS

| | | |
|---|---|---|
| JP | S61-112865 A | 5/1986 |
| JP | 2000-329237 A | 11/2000 |
| JP | 2001-099328 A | 4/2001 |
| JP | 2006-322528 A | 11/2006 |
| WO | 94/08161 A1 | 4/1994 |
| WO | 2007/016980 A1 | 2/2007 |

OTHER PUBLICATIONS

International Search Report issued in PCT/JP2014/061047 dated Jul. 22, 2014 (2 pages).
Office Action issued in corresponding Chinese Application No. 201480035099.7 dated Feb. 28, 2017, and English translation thereof (11 pages).
Office Action in counterpart Chinese Patent Application No. 201480035099.7 dated Oct. 18, 2018 (6 pages).

\* cited by examiner

HERMETIC SEAL DEVICE

TECHNICAL FIELD

The present invention relates to a sealing device for, for example, partitioning an annular space between a rotary shaft and a housing surrounding the rotary shaft, into an atmospheric pressure space and a vacuum space.

BACKGROUND ART

Hitherto, in order to provide a rotational force to a device within a vacuum container whose inner space is made vacuum, a rotary shaft for rotational force transmission may be provided so as to project from the inside of the vacuum container to the outside thereof.

In this case, in order to maintain a vacuum state in the vacuum container, it is necessary to prevent atmospheric air from leaking from an annular space between the rotary shaft and a through hole, which is provided in the vacuum container for inserting the rotary shaft therethrough, into the vacuum container to maintain the vacuum state. Thus, a sealing device is mounted in the annular space (e.g., see PATENT LITERATURE 1).

CITATION LIST

Patent Literature

PATENT LITERATURE 1: Japanese Laid-Open Patent Publication No. 2001-99328

SUMMARY OF INVENTION

Technical Problem

For example, according to JIS (Japanese Industrial Standards) H0211, regarding pressure region, a region of equal to or higher than $10^2$ Pa is categorized as low vacuum, a region of $10^2$ to $10^{-1}$ Pa is categorized as medium vacuum, a region of $10^{-1}$ to $10^{-5}$ Pa is categorized as high vacuum, and a region of equal to or lower than $10^{-5}$ Pa is categorized as ultra-high vacuum.

The above-described conventional sealing device is able to stably seal in the low to high vacuum region.

However, when the conventional sealing device is used in the ultra-high vacuum region, it is possible to maintain a predetermined degree of vacuum in a state where the rotary shaft stops. However, when the rotary shaft starts rotating from the state where the rotary shaft stops, the degree of vacuum instantaneously decreases in some cases in a state where the rotary shaft rotates. Hereinafter, such a change in the degree of vacuum is referred to as "vacuum change".

In the above-described conventional sealing device, a tightening force of a seal lip of the sealing device with respect to the rotary shaft tends to increase as the degree of vacuum increases. Therefore, the tightening force further increases when an ultra-high vacuum state is created. Thus, frictional vibration (so-called stick slip), which occurs between the rotary shaft and the seal lip when the rotary shaft starts rotating, is likely to occur. Due to the stick slip, the seal lip instantaneously separates from the outer peripheral surface of the rotary shaft, so that the atmospheric pressure leaks to the vacuum container side, which is thought to be one of the reasons for the vacuum change.

When the vacuum change occurs, there is the possibility that the vacuum change adversely affects a device, a product, or the like within the vacuum container. Thus, it is necessary to suppress occurrence of the vacuum change as much as possible to maintain a stable vacuum environment.

The present invention has been made in view of such a situation, and an object of the present invention is to provide a sealing device which is able to suppress a vacuum change to maintain a stable vacuum environment.

Solution to Problem

The present invention for achieving the above-described object is a sealing device which partitions an annular space formed between a rotary shaft and a housing surrounding the rotary shaft, into a low-pressure space and a high-pressure space whose pressure is higher than that of the low-pressure space, in an axial direction, the sealing device comprising an annular seal portion formed of an elastic material and being in slidable contact with an outer peripheral surface of the rotary shaft, wherein on an inner peripheral surface of the seal portion, a main lip is formed so as to be in slidable contact with the outer peripheral surface of the rotary shaft, and an inclined surface is formed so as to extend from the main lip toward the low-pressure space side and gradually enlarge in diameter toward the low-pressure space side; and on the inclined surface, a plurality of annular projections are formed along the axial direction so as to be in slidable contact with the outer peripheral surface of the rotary shaft in a state where the main lip is in slidable contact with the outer peripheral surface of the rotary shaft.

According to the sealing device configured as described above, in addition to the main lip, the plurality of annular projections are in slidable contact with the outer peripheral surface of the rotary shaft. Thus, it is possible to decrease a surface pressure per unit area when the main lip is in slidable contact with the outer peripheral surface, as compared to the case where, for example, only the main lip is in slidable contact with the outer peripheral surface. As a result, even when the tightening force of the main lip with respect to the rotary shaft increases due to a negative pressure by the low-pressure space, it is possible to suppress stick slip which occurs at the main lip when the rotary shaft starts rotating from a state where the rotary shaft stops. Accordingly, it is possible to suppress instantaneous separation of the main lip from the outer peripheral surface of the rotary shaft which is caused due to stick slip. As a result, it is possible to suppress occurrence of a vacuum change which occurs when the rotary shaft initially moves.

Since the plurality of annular projections, which are formed on the inclined surface so as to be in slidable contact with the outer peripheral surface in a state where the main lip is in slidable contact with the outer peripheral surface of the rotary shaft, it is possible to partition a space between the low-pressure space and the high-pressure space in multiple stages with the plurality of annular projections in addition to the main lip. Thus, it is possible to reduce a negative pressure applied to the main lip, in a phased manner by the plurality of annular projections which are formed at the low-pressure space side. Therefore, it is possible to suppress leak of the pressure from the high-pressure space toward the low-pressure space. As a result, it is possible to also suppress pressure leak which is caused due to a factor other than stick slip.

According to the present invention, since it is possible to suppress a vacuum change and also suppress pressure leak as described above, it is possible to maintain a stable vacuum environment.

In the sealing device, preferably, the plurality of annular projections include a first annular projection provided at the main lip side, and a second annular projection provided at the low-pressure space side with respect to the first annular projection, and the projection dimension of the second annular projection is larger than that of the first annular projection such that contact pressures of the first and second annular projections with respect to the outer peripheral surface of the rotary shaft become uniform.

In this case, the contact pressures of the first and second annular projections with respect to the outer peripheral surface of the rotary shaft can be made uniform by the second annular projection. Thus, it is possible to suppress occurrence of variations in interference and tightening force with respect to the outer peripheral surface of the rotary shaft among the respective annular projections. Accordingly, it is possible to more assuredly partition the space between the low-pressure space and the high-pressure space in multiple stages. As a result, it is possible to more effectively suppress pressure leak.

In the sealing device, a plurality of the first annular projections are preferably provided. In this case, since the partition between the low-pressure space and the high-pressure space can be made in more stages, it is possible to more effectively suppress pressure leak.

In the sealing device, a distal end of the first annular projection and a distal end of the second annular projection may be formed along a tangent line passing through a distal end of the main lip and the distal end of the second annular projection.

In this case, the contact pressures of the first and second annular projections with respect to the outer peripheral surface of the rotary shaft can be made more uniform.

In the sealing device, an inclination angle of the inclined surface relative to the axial direction is preferably set at 10 to 20 degrees. In this case, it is possible to cause the main lip and each annular projection to be appropriately in slidable contact with the outer peripheral surface of the rotary shaft.

In the sealing device, each of the plurality of annular projections may be formed such that the distal end thereof has a circular arc cross-sectional shape. In this case, it is possible to suppress an excessive increase in the area of contact when each annular projection is in slidable contact with the outer peripheral surface of the rotary shaft, and thus it is possible to reduce the frictional force between the annular projection and the rotary shaft. Moreover, it is possible to assuredly cause each annular projection to be in slidable contact with the outer peripheral surface, and thus it is possible to ensure sealing performance.

Advantageous Effects of Invention

According to the sealing device of the present invention, it is possible to suppress a vacuum change to maintain a stable vacuum environment.

DESCRIPTION OF EMBODIMENTS

Next, embodiments of the present invention will be described with reference to the accompanying drawings.

Figure 1:
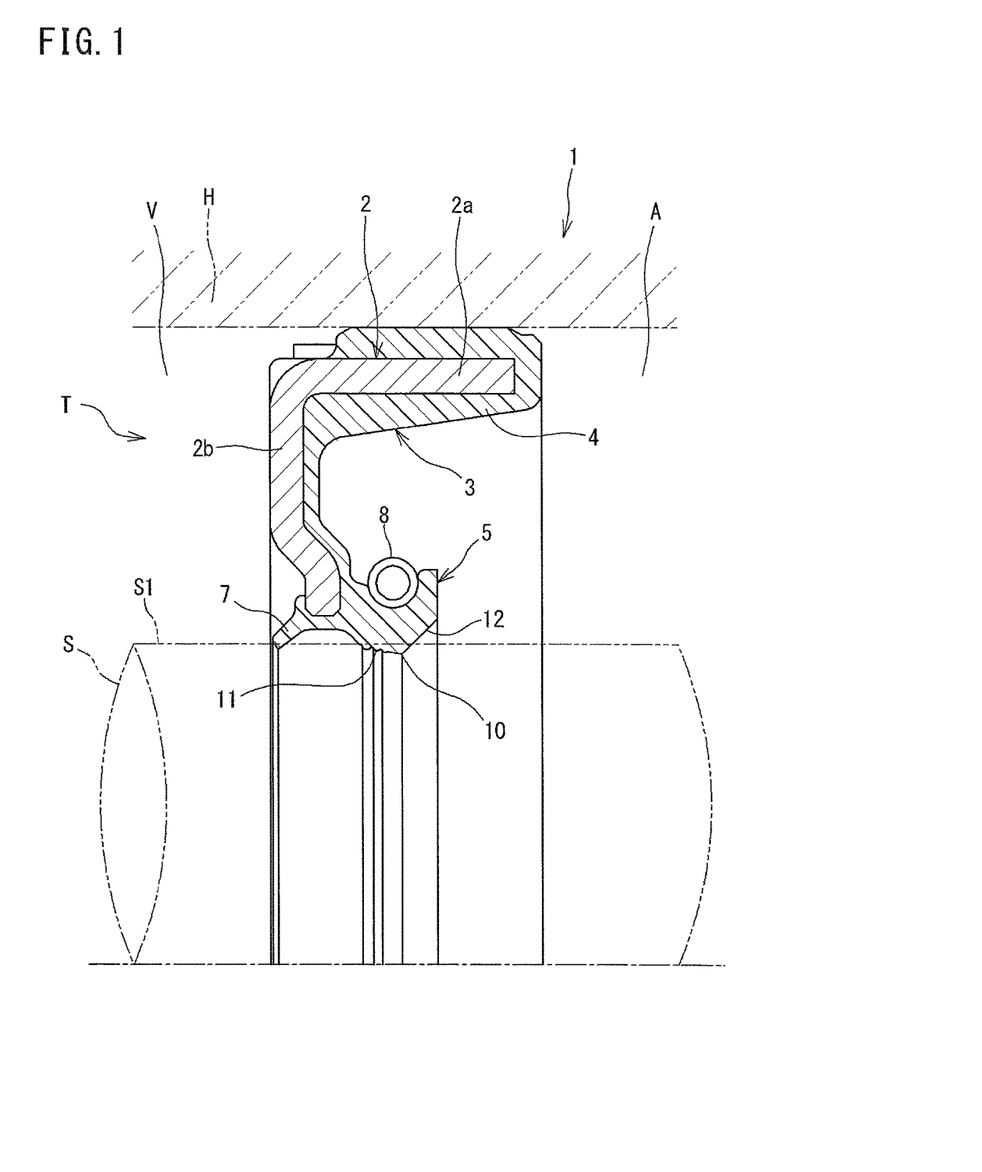
FIG. 1 is a cross-sectional view of a sealing device according to an embodiment of the present invention.

FIG. 1 is a cross-sectional view of a sealing device according to an embodiment of the present invention. The sealing device 1 is mounted to a vacuum container (not shown) whose interior is made into a vacuum environment. The sealing device 1 is used for partitioning an annular space T formed between a rotary shaft S and a housing H surrounding the rotary shaft S, into an axial atmospheric pressure space A (a high-pressure space, the right side of the sheet surface in FIG. 1) and a vacuum space V (a low-pressure space, the left side of the sheet surface in FIG. 1) in a sealed state.

In the present embodiment, the vacuum space V is maintained in a so-called ultra-high vacuum ($10^{-5}$ Pa (absolute pressure) or lower) as a pressure region category.

The rotary shaft S is a rotation transmission shaft for providing a rotational force to a device provided within the vacuum container. The rotary shaft S is inserted through the tubular housing H which is provided to the vacuum container and provides communication between the inside and the outside of the vacuum container. Accordingly, the rotary shaft S is provided so as to project from the vacuum space V which is the inside of the vacuum container toward the atmospheric pressure space A which is the outside of the vacuum container.

The sealing device 1 partitions the annular space T in an axial direction such that the rotary shaft S is rotatable, and includes a core metal 2 made of a metal, and a seal member 3 which is formed of an elastic material such as fluorocarbon rubber and bonded by vulcanization to the core metal 2.

The core metal 2 is formed in an annular shape by pressing a steel plate such as SPCC. The core metal 2 includes a cylindrical portion 2a having a cylindrical shape, and an annular portion 2b formed by bending an end portion, at one side in the axial direction, of the cylindrical portion 2a to a radially inner side. Thus, the core metal 2 is formed so as to have an L cross-sectional shape.

The seal member 3 includes a body portion 4, a seal portion 5 extending from the inner peripheral end of the annular portion 2b, and an auxiliary lip 7 similarly extending from the inner peripheral end of the annular portion 2b. The body portion 4 is formed so as to extend from the outer peripheral surface of the cylindrical portion 2a around an end surface, at the atmospheric pressure space A side, of the cylindrical portion 2a and extend along the inner peripheral surface of the cylindrical portion 2a. In addition, the body portion 4 is formed and bonded along a side surface, at the atmospheric pressure space A side, of the annular portion 2b.

The core metal 2 is press-fitted into the housing H via the body portion 4, so that the sealing device 1 is fixed to the housing H.

The auxiliary lip 7 extends from the inner peripheral end of the annular portion 2b as a base end toward the vacuum space V side. In addition, the auxiliary lip 7 is provided so as to project at the radially inner side to be in slidable contact with an outer peripheral surface S1 of the rotary shaft S.

The seal portion 5 is an annular member extending from the inner peripheral end of the annular portion 2b as a base end toward the atmospheric pressure space A side.

A garter spring 8 for enhancing the sealing performance by tightening and pressing the seal portion 5 toward the radially inner side is mounted at the outer peripheral surface side of the seal portion 5.

The seal portion 5 is in slidable contact with the outer peripheral surface S1 of the rotary shaft S. Accordingly, the seal portion 5 seals the annular space T so as to prevent the pressure of the atmospheric pressure space A from leaking through between the rotary shaft S and the housing H to the vacuum space V.

On the inner peripheral surface of the seal portion 5, a main lip 10 is formed so as to be in slidable contact with the outer peripheral surface S1 of the rotary shaft S, a vacuum space side inclined surface 11 is formed so as to extend from the main lip 10 toward the vacuum space V side and gradually enlarge in diameter toward the vacuum space V side, and an atmospheric pressure space side inclined surface 12 is formed so as to extend from the main lip 10 toward the atmospheric pressure space A side and gradually enlarge in diameter toward the atmospheric pressure space A side. Thus, the main lip 10 is composed of a ridge formed by the vacuum space side inclined surface 11 and the atmospheric pressure space side inclined surface 12, and is formed so as to have a mountain-like cross-sectional shape.

The seal portion 5 extends from the inner peripheral end of the annular portion 2b as a base end toward the atmospheric pressure space A side as described above. Therefore, the seal portion 5 is configured such that the end portion thereof at the atmospheric pressure space A side can oscillate about the end portion thereof at the vacuum space V side in the radial direction. FIG. 1 shows the seal portion 5 that is in a free state.

When the rotary shaft S is inserted into the inner peripheral surface side of the seal portion 5, the end portion, at the atmospheric pressure space A side, of the seal portion 5 oscillates toward a radially outer side, and the end portion, at the atmospheric pressure space A side, and the main lip 10, of the seal portion 5 elastically deform so as to slightly enlarge in diameter. The main lip 10 is in slidable contact with the outer peripheral surface S1 of the rotary shaft S in a state where the main lip 10 elastically deforms so as to slightly enlarge in diameter.

Figure 2:
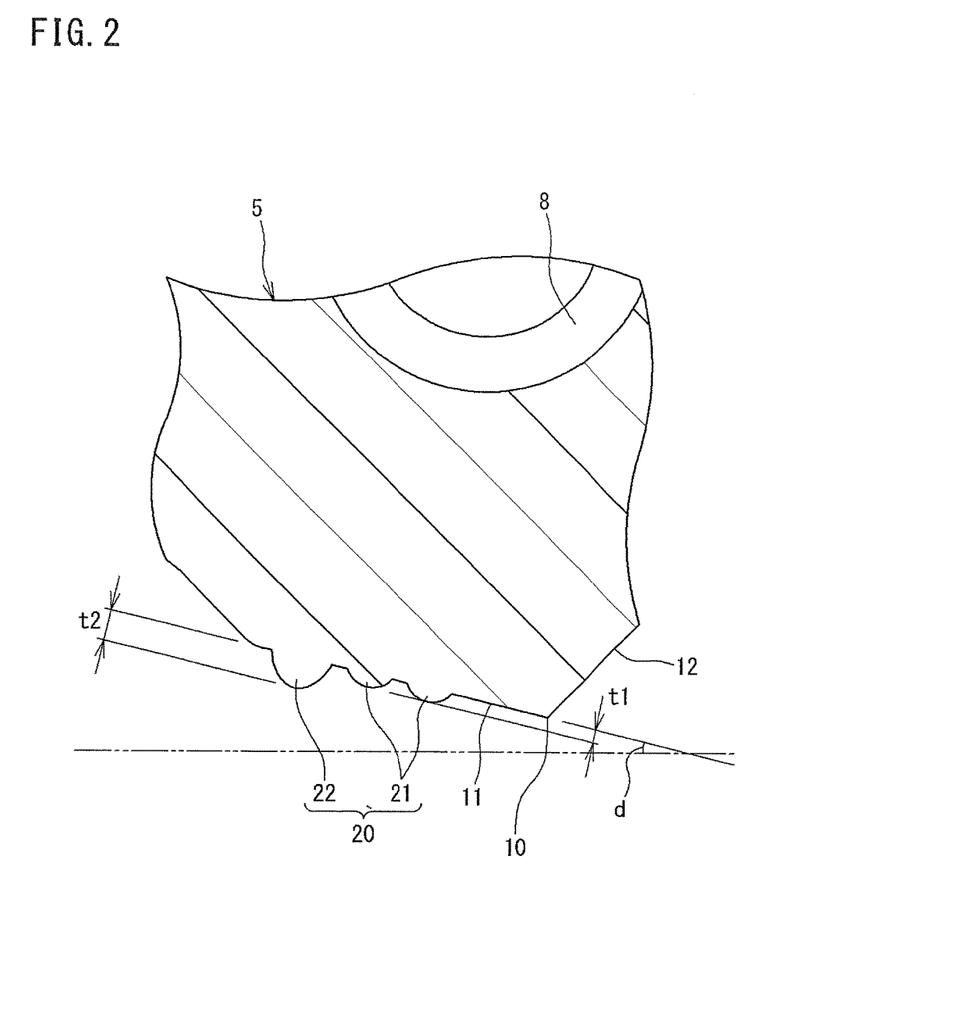
FIG. 2 is an enlarged cross-sectional view of a main part of a main lip in FIG. 1.

FIG. 2 is an enlarged cross-sectional view of a main part of the seal portion 5 in FIG. 1. FIG. 2 shows the seal portion 5 that is in a free state.

The vacuum space side inclined surface 11 of the seal portion 5 is formed as a conical inner peripheral surface whose inclination angle d relative to the axial direction is set, for example, in a range of 10 to 20 degrees.

On the vacuum space side inclined surface 11, a plurality of (three in the illustrated example) annular projections 20 are formed so as to project from the vacuum space side inclined surface 11 toward the radially inner side and be arranged at a predetermined interval along the axial direction.

Each annular projection 20 is formed such that a distal end thereof has a circular arc cross-sectional shape. The respective annular projections 20 include first annular projections 21 provided at the main lip 10 side, and a second annular projection 22 provided at the vacuum space V side with respect to the first annular projections 21.

The second annular projection 22 is formed such that a projection dimension t2 thereof is a value larger than a projection dimension t1 of each first annular projection 21.

In addition, the two first annular projections 21 are formed between the second annular projection 22 and the main lip 10. The two first annular projections 21 are formed so as to have the same projection dimension t1.

As described later, these annular projections 20 are formed such that the distal ends thereof are in slidable contact with the outer peripheral surface S1 when the rotary shaft S is inserted into the sealing device 1 so that the main lip 10 is in slidable contact with the outer peripheral surface S1.

Figure 3:
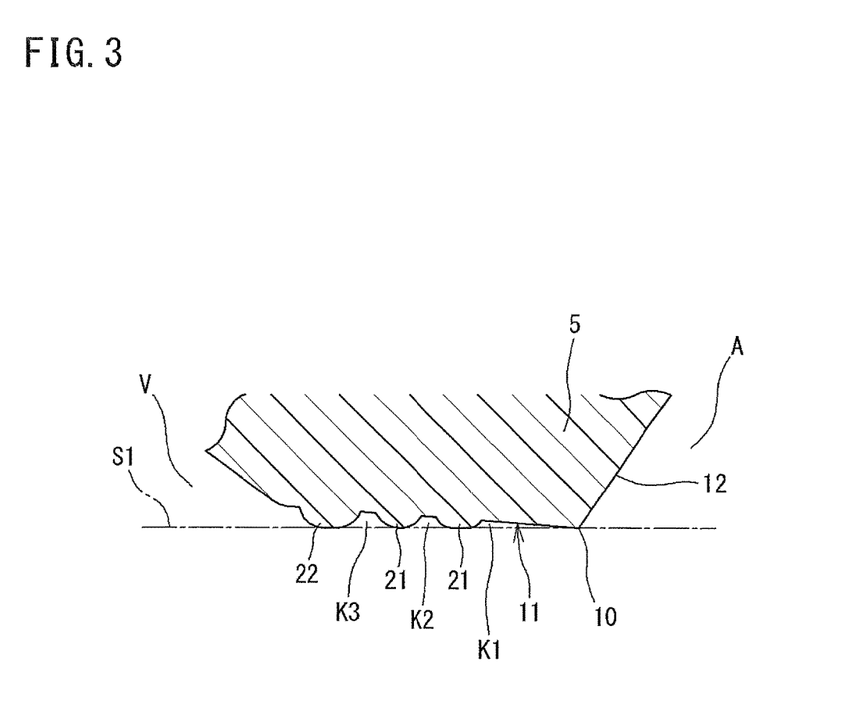
FIG. 3 is a cross-sectional view of the main lip when a rotary shaft is inserted into an inner peripheral side of the sealing device.

FIG. 3 is a cross-sectional view of the main lip 10 when the rotary shaft S is inserted into the inner peripheral side of the sealing device 1.

As described above, when the rotary shaft S is inserted into the inner peripheral surface side of the seal portion 5, the end portion, at the atmospheric pressure space A side, of the seal portion 5 oscillates about the end portion, at the vacuum space V side, of the seal portion 5 toward the radially outer side. Accordingly, the main lip 10 of the seal portion 5 comes into slidable contact with the outer peripheral surface S1 of the rotary shaft S.

In addition, the inclination angle d (FIG. 2) of the vacuum space side inclined surface 11 decreases as a result of the oscillation of the end portion, at the atmospheric pressure space A side, of the seal portion 5 toward the radially outer side, so that the vacuum space side inclined surface 11 comes close to the outer peripheral surface S1 of the rotary shaft S. Accordingly, the distal end of each annular projection 20 comes into slidable contact with the outer peripheral surface S1 of the rotary shaft S. That is, each annular projection 20 is formed such that the distal end thereof is in slidable contact with the outer peripheral surface S1 in a state where the main lip 10 is in slidable contact with the outer peripheral surface S1 of the rotary shaft S.

At that time, each annular projection 20 forms a space K1, K2, or K3 between the vacuum space side inclined surface 11 and the outer peripheral surface S1, together with the adjacently located annular projection 20 or main lip 10.

The projection dimensions t1 and t2 (FIG. 2) of the respective annular projections 20, the interval between the adjacent annular projections 20, and the interval between the annular projection 20 and the main lip 10 are set at such values as to allow the spaces K1 to K3 to be formed.

Here, the vacuum space side inclined surface 11 comes close to the outer peripheral surface S1 when the inclination angle d decreases. Thus, if the annular projection 20 that is most distant from the main lip 10 (the second annular projection 22) has the same projection dimension as those of the other annular projections 20, an interference and a tightening force of the annular projection 20 when the annular projection 20 comes into contact with the outer peripheral surface S1 are relatively smaller than those of the other annular projections 20.

Therefore, the projection dimension t2 of the second annular projection 22 is set larger than the projection dimension t1 of each first annular projection 21 such that a contact pressure of each annular projection 20 with respect to the outer peripheral surface S1 becomes uniform.

Accordingly, the contact pressure of each annular projection 20 with respect to the outer peripheral surface S1 becomes uniform, so that it is possible to suppress occurrence of variations in interference and tightening force when contacting with the outer peripheral surface S1, among the respective annular projections 20.

According to the sealing device 1 configured as described above, in addition to the main lip 10, the plurality of annular projections 20 are in slidable contact with the outer peripheral surface S1 of the rotary shaft S. Thus, it is possible to decrease a surface pressure per unit area when the main lip 10 is in slidable contact with the outer peripheral surface S1, as compared to the case where, for example, only the main lip 10 is in slidable contact with the outer peripheral surface S1. As a result, even when the tightening force of the main lip 10 with respect to the rotary shaft S increases due to a negative pressure by the vacuum space V, it is possible to suppress stick slip which occurs at the main lip 10 when the rotary shaft S starts rotating from a state where the rotary shaft S stops. Accordingly, it is possible to suppress instantaneous separation of the main lip 10 from the outer peripheral surface S1 of the rotary shaft S which is caused due to stick slip. As a result, it is possible to suppress occurrence of a vacuum change which occurs when the rotary shaft S initially moves.

Since the plurality of annular projections 20, which are in slidable contact at the distal ends thereof with the outer peripheral surface S1 and form the space K1 to K3 together with the adjacently located annular projection 20 or main lip 10 when the main lip 10 is in slidable contact with the outer peripheral surface S1 of the rotary shaft S, are formed on the vacuum space side inclined surface 11, it is possible to partition a space between the vacuum space V and the atmospheric pressure space A in multiple stages with the plurality of annular projections 20 in addition to the main lip 10. Thus, it is possible to reduce a negative pressure applied to the main lip 10, in a phased manner by the plurality of annular projections 20 which are formed at the vacuum space V side. Therefore, it is possible to suppress leak of the pressure from the atmospheric pressure space A toward the vacuum space V. As a result, it is possible to also suppress pressure leak which is caused due to a factor other than stick slip.

According to the sealing device 1 of the present embodiment, since it is possible to suppress a vacuum change and also suppress pressure leak as described above, it is possible to maintain a stable vacuum environment.

In the present embodiment, the partition between the vacuum space V and the atmospheric pressure space A is made in four stages, including the main lip 10, by providing the two first annular projections 21. Thus, it is possible to more effectively suppress pressure leak to the vacuum space V side.

According to the present embodiment, the annular projections 20 form the spaces K1 to K3 together with the annular projection 20 or main lip 10 adjacent thereto. Thus, it is possible to cause a lubricant supplied between the main lip 10 and the rotary shaft S, to remain in the spaces K1 to K3.

Accordingly, it is possible to reduce the frictional force between the main lip 10 and the outer peripheral surface S1 of the rotary shaft S, so that it is possible to further effectively suppress stick slip and it is possible to reduce abrasion occurring with friction. Thus, it is possible to extend the service life of the sealing device 1.

In the present embodiment, the distal end of each annular projection 20 is formed in a circular arc cross-sectional shape. Thus, it is possible to suppress an excessive increase in the area of contact when the annular projection 20 is in slidable contact with the outer peripheral surface S1 of the rotary shaft S, so that it is possible to reduce the frictional force between the annular projection 20 and the rotary shaft S. Moreover, since the distal end of each annular projection 20 is formed in a circular arc cross-sectional shape, it is possible to assuredly cause the annular projection 20 to be in slidable contact with the outer peripheral surface S1, so that it is also possible to ensure sealing performance.

Each annular projection 20 whose distal end has a circular arc cross-sectional shape is molded integrally with the entire seal member 3 through vulcanization molding with a mold having surface roughness reduced as much as possible. Thus, it is possible to decrease the surface roughness of the distal end of each annular projection 20, so that it is possible to further reduce the frictional force along with the lubricant remaining in the spaces K1 to K3 as described above.

In the present embodiment, the projection dimension t2 of the second annular projection 22 is set larger than the projection dimension t1 of each first annular projection 21. Accordingly, each annular projection 20 is dimensioned such that when each annular projection 20 is in slidable contact with the outer peripheral surface S1, the contact pressure of each annular projection 20 with respect to the outer peripheral surface S1 can be made uniform. Thus, the contact pressure of each annular projection 20 with respect to the outer peripheral surface S1 can be made uniform. This can suppress occurrence of variations in interference and tightening force when contacting with the outer peripheral surface S1, among the respective annular projections 20. Thus, it is possible to assuredly form the spaces K1 to K3 to assuredly partition the space between the vacuum space V and the atmospheric pressure space A in multiple stages. As a result, it is possible to more effectively suppress pressure leak to the vacuum space V.

In the present embodiment, the inclination angle d of the vacuum space side inclined surface 11 of the main lip 10 in a free state relative to the axial direction is set in the range of 10 to 20 degrees. Accordingly, it is possible to cause the main lip 10 and each annular projection formed as described above to be appropriately in slidable contact with the outer peripheral surface S1 of the rotary shaft S.

Figure 4A:
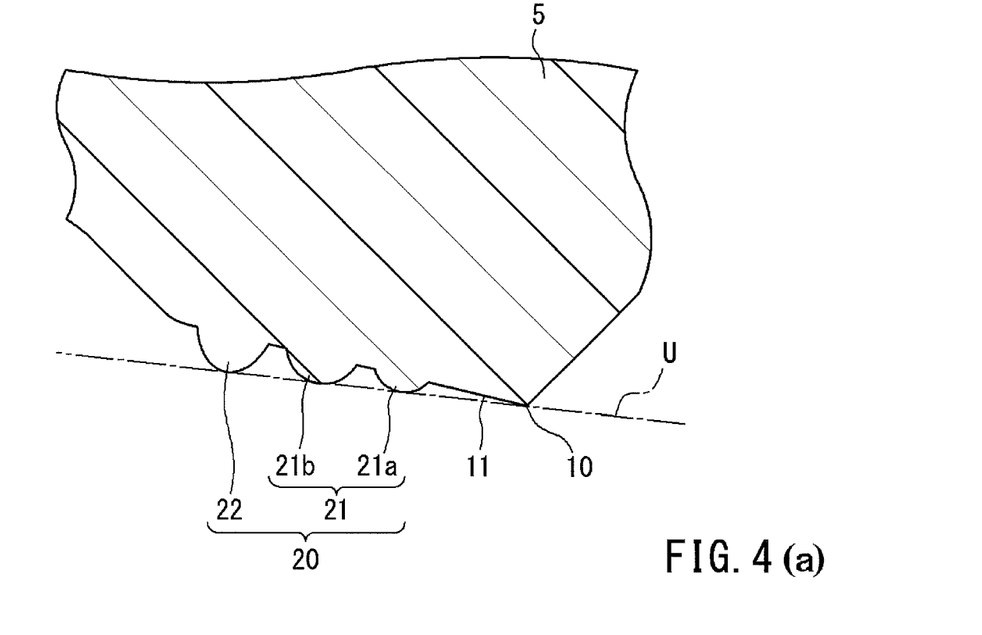
FIG. 4(a) is an enlarged cross-sectional view of a main part of a main lip according to a modification.

The present invention is not limited to the above-described embodiment. In the above-described embodiment, the case has been illustrated in which the two first annular projections 21 having the same projection dimension t1 are formed on the vacuum space side inclined surface 11. In contrast, for example, as shown in FIG. 4(a), the two first annular projections 21 may be formed such that the projection dimension of a first annular projection 21a at the main lip 10 side is set smaller than the projection dimension of a first annular projection 21b at the second annular projection 22 side.

More specifically, the distal end of each first annular projection 21 and the distal end of the second annular projection 22 when the main lip 10 and each annular projection 20 are in a free state are formed along a tangent line U passing through the distal end of the main lip 10 and the distal end of the second annular projection 22.

In this case, the plurality of annular projections 20 are dimensioned such that when the main lip 10 is in slidable contact with the outer peripheral surface S1 and each annular projection 20 is in slidable contact with the outer peripheral surface S1, the contact pressure of each annular projection 20 with respect to the outer peripheral surface S1 can be made uniform. Thus, the contact pressure of each annular projection 20 with respect to the outer peripheral surface S1 can be made more uniform, so that it is possible to more appropriately set the interference and the tightening force of each annular projection 20.

In the above-described embodiment, the case has been shown in which the partition between the vacuum space V and the atmospheric pressure space A is made in four stages, including the main lip 10, by providing the two first annular projections 21. In contrast, as shown in FIG. 4(b), more first annular projections 21 (three in the illustrated example) may be provided.

Figure 4B:
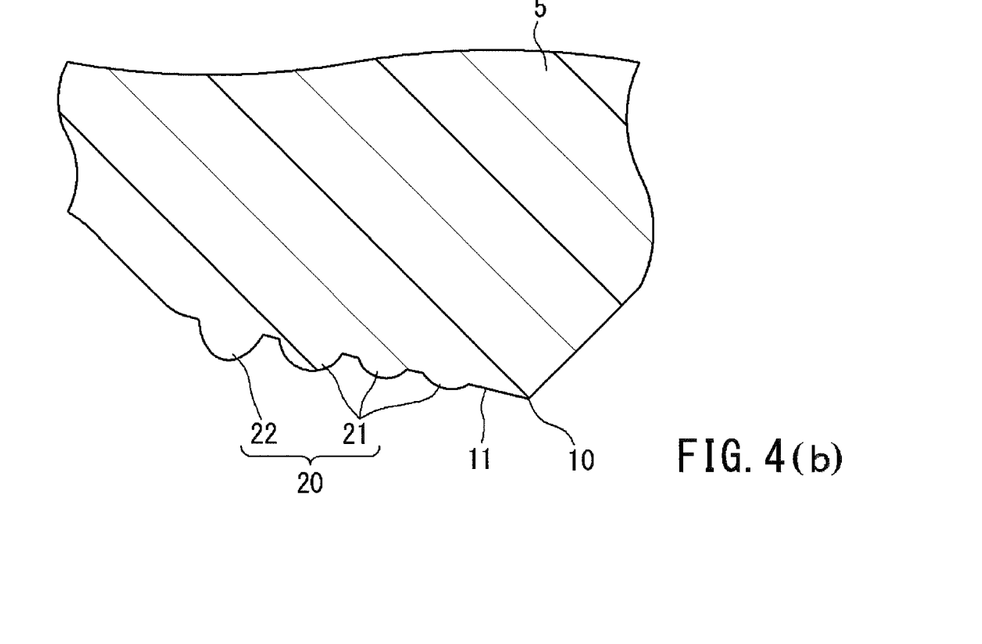
FIG. 4(b) is an enlarged cross-sectional view of a main part of a main lip according to another modification.

In FIG. 4(b), the projection dimension of the second annular projection 22 is set largest, and the projection dimension of each first annular projection 21 is set such that the first annular projection 21 formed at a position more distant from the main lip 10 in the axial direction has a larger projection dimension.

Since the partition between the vacuum space V and the atmospheric pressure space A is made in more stages as described above, it is possible to further effectively suppress pressure leak to the vacuum space V side.

REFERENCE SIGNS LIST 1 sealing device
10 main lip
11 vacuum space side inclined surface (inclined surface)
20 annular projection
21, 21a, 21b first annular projection
22 second annular projection
S rotary shaft
S1 outer peripheral surface
T annular space
A atmospheric pressure space (high-pressure space)
V vacuum space (low-pressure space)

The invention claimed is:

1. A sealing device which partitions an annular space formed between a rotary shaft and a housing surrounding the rotary shaft, into a low-pressure space and a high-pressure space whose pressure is higher than that of the low-pressure space, in an axial direction, the sealing device comprising:
   an annular seal portion formed of an elastic material and being in constant and direct sliding contact with an outer peripheral surface of the rotary shaft, wherein
   on an inner peripheral surface of the seal portion, a main lip is formed so as to be in constant and direct sliding contact with the outer peripheral surface of the rotary shaft, and an inclined surface is formed so as to extend from the main lip toward the low-pressure space side and gradually enlarge in diameter toward the low-pressure space side, and
   on the inclined surface, a plurality of annular projections are formed along the axial direction so as to be in constant and direct sliding contact with the outer peripheral surface of the rotary shaft in a state where the main lip is in constant and direct sliding contact with the outer peripheral surface of the rotary shaft,
   the plurality of annular projections include a first annular projection provided at the main lip side, and a second annular projection provided at the low-pressure space side with respect to the first annular projection,
   the projection dimension of the second annular projection is larger than that of the first annular projection such that contact pressures of the first and second annular projections with respect to the outer peripheral surface of the rotary shaft become uniform, and
   a distal end of the first annular projection and a distal end of the second annular projection are formed along a tangent line passing through a distal end of the main lip and the distal end of the second annular projection when the main lip and each annular projection are in a free state and when the main lip and each annular projection are in constant and direct sliding contact with the outer peripheral surface of the rotary shaft.

2. The sealing device according to claim 1, wherein a plurality of the first annular projections are provided.

3. The sealing device according to claim 1, wherein an inclination angle of the inclined surface relative to the axial direction is set at 10 to 20 degrees.

4. The sealing device according to claim 1, wherein each of the plurality of annular projections is formed such that the distal end thereof has a circular arc cross-sectional shape.

* * * * *